(12) United States Patent
Uryu et al.

(10) Patent No.: US 9,231,449 B2
(45) Date of Patent: Jan. 5, 2016

(54) ROTATING ELECTRIC MACHINE AND ELECTRIC POWER STEERING DEVICE

(71) Applicant: DENSO CORPORATION, Kariya, Aichi-pref. (JP)

(72) Inventors: Nobuhiko Uryu, Kariya (JP); Masashi Yamasaki, Obu (JP)

(73) Assignee: DENSO CORPORATION, Kariya (JP)

(*) Notice: Subject to any disclaimer, the term of this patent is extended or adjusted under 35 U.S.C. 154(b) by 233 days.

(21) Appl. No.: 13/956,843

(22) Filed: Aug. 1, 2013

(65) Prior Publication Data

US 2014/0035407 A1 Feb. 6, 2014

(30) Foreign Application Priority Data

Aug. 3, 2012 (JP) .................. 2012-172889

(51) Int. Cl.
| H02K 5/15 | (2006.01) |
| H02K 7/11 | (2006.01) |
| H02K 5/04 | (2006.01) |
| H02K 11/00 | (2006.01) |
| H02K 7/116 | (2006.01) |

(52) U.S. Cl.
CPC .. *H02K 5/04* (2013.01); *H02K 5/15* (2013.01); *H02K 7/116* (2013.01); *H02K 11/0094* (2013.01); *H02K 11/0073* (2013.01)

(58) Field of Classification Search
CPC .............................. H02K 11/0094; H02K 5/04
USPC .......... 310/427, 71, 68 R, 89, 67 R, 400, 413, 310/420, 90; 180/443
See application file for complete search history.

(56) References Cited

U.S. PATENT DOCUMENTS

| 6,081,056 | A | * | 6/2000 | Takagi | ................. H02K 5/08 310/216.137 |
| 6,348,753 | B1 | | 2/2002 | Sakai et al. | |
| 6,810,985 | B1 | | 11/2004 | Budaker et al. | |
| 2008/0017438 | A1 | * | 1/2008 | Kanda et al. | .................. 180/443 |
| 2010/0308700 | A1 | * | 12/2010 | Isoda et al. | .................. 310/68 D |

(Continued)

FOREIGN PATENT DOCUMENTS

| JP | 2001-128396 | 5/2001 |
| JP | 2005-304213 | * 10/2005 |

(Continued)

OTHER PUBLICATIONS

Machine translation for JP 2009-118631.*

(Continued)

*Primary Examiner* — Terrance Kenerly
*Assistant Examiner* — Ahmed Elnakib
(74) *Attorney, Agent, or Firm* — Nixon & Vanderhye P.C.

(57) ABSTRACT

A rotating electric machine for driving a drive object is provided. The rotating electric machine includes a motor case, a stator, a winding, a rotor, a shaft, a base cap, an end cap, an output rod, base cap holes, end cap holes, and through bolts. The base cap has base cap flanges formed on a circumferential edge and extending radially-outward beyond an outer wall of the motor case. The end cap has end cap flanges formed on a circumferential edge and extending radially-outward beyond the outer wall of the motor case. Base cap holes are formed on the base cap flanges and end cap holes in axial alignment with the base cap holes are formed on the end cap flanges. Through bolts fasten the base cap flanges to the end cap flanges.

8 Claims, 8 Drawing Sheets

(56) References Cited

U.S. PATENT DOCUMENTS

| | | | |
|---|---|---|---|
| 2010/0327677 A1* | 12/2010 | Iwai et al. | 310/64 |
| 2011/0000737 A1* | 1/2011 | Nagase et al. | 180/444 |
| 2011/0285225 A1* | 11/2011 | Matsuda et al. | 310/64 |
| 2012/0160596 A1 | 6/2012 | Yamasaki | |

FOREIGN PATENT DOCUMENTS

| | | | |
|---|---|---|---|
| JP | 2009-118631 | * | 5/2009 |
| JP | 2012-131447 | | 7/2012 |
| JP | 2012-143036 | | 7/2012 |
| WO | WO 2013021250 | * | 2/2013 |

OTHER PUBLICATIONS

English translation for JP 2005-304213.*

U.S. Appl. No. 13/834,234, filed Mar. 15, 2013 in the name of Tomizawa et al.

Office Action (2 pages) dated Jun. 19, 2014, issued in corresponding Japanese Application No. 2012-172889 and English translation (2 pages).

* cited by examiner

ROTATING ELECTRIC MACHINE AND ELECTRIC POWER STEERING DEVICE

CROSS-REFERENCE TO RELATED APPLICATION

This application is based on and claims the benefit of priority of Japanese Patent Application No. 2012-172889 filed on Aug. 3, 2012, the disclosure of which is incorporated herein by reference.

TECHNICAL FIELD

The present disclosure generally relates to a rotating electric machine and an electric power steering device driven by the rotating electric machine.

BACKGROUND

Conventionally, a rotating electric machine is used as a power-assist source for a power steering device. For example, the rotating electric machine of a power steering device described in Japanese patent No. 4,679,783, a front end cap and a rear end cap respectively covering front and rear ends of a pipe-shaped motor case are fastened together by two through bolts.

The rotating electric machine is configured to have a structure including a flange of the front end cap and a flange of the rear end cap fastened together by two through bolts. Therefore, the axial force for fastening each of the two through bolts is greater than the axial force of a similar structure having three or more bolts. As a result, the through bolts must have a greater outer diameter. Further, the through bolts are positioned radially outside of the motor case. Therefore, the total overall outer diameter of the rotating electric machine, including the through bolts, may increase resulting in a greater overall volume and/or size of the rotating electric machine.

Further, the two through bolts of the rotating electric machine are positioned unevenly around the circumference of the front and rear end caps. Therefore, the axial force caused by the fastening of the through bolt is unevenly applied around the circumferences of the front and the end caps. In such a manner, the front and rear end caps may be coaxially misaligned causing misalignment of the shaft with respect to the bearings within the front and rear end caps and results in an increase of an airgap between the rotor and the stator. As a result, the output of the rotating electric machine may decrease.

Moreover, since the rotating electric machine is used as the driving source of a power steering device in a vehicle, the rotating electric machine may be shaken or vibrated as the vehicle travels, for example. Stress from such vibration may be concentrated at the two fastening positions of the front and rear end caps where the two through bolts fasten the front and rear end caps. Therefore, such fastening positions on the flanges may become deformed and/or broken. To prevent deformation and/or breakage, the flanges may be reinforced resulting in flanges of greater size. However, reinforcing the flanges may result in larger front and rear end caps causing the rotating electric machine to have a greater total volume and/or size.

SUMMARY

It is an object of the present disclosure to provide a compact high-output rotating electric machine for an electric power steering device.

In an aspect of the present disclosure, the rotating electric machine includes a motor case, a stator, a winding, a rotor, a shaft, a base cap, an end cap, an output rod, base cap holes, end cap holes, and through bolts. The motor case has a center axis and a cylinder shape with a first motor end and a second motor end such that the second motor end is opposite to the first motor end. The stator is housed in the motor case. The winding is wound on the stator. The rotor is rotatably disposed inside of the stator. The shaft is disposed at a rotation center of the rotor. The base cap covers the first motor end of the motor case and has a first shaft hole at an axial center of the base cap. The shaft rotates within the first shaft hole. The base cap also has base cap flanges formed on a circumferential edge of the base cap where the base cap flanges extend radially-outward beyond an outer wall of the motor case. The end cap covers the second motor end of the motor case and has a second shaft hole at an axial center of the end cap. The shaft rotates within the second shaft hole. The end cap also has end cap flanges formed on a circumferential edge of the end cap where the end cap flanges extend radially-outward beyond the outer wall of the motor case. The output rod is disposed on the shaft and is connected to a drive object for outputting a rotation to the drive object. At least three base cap holes are formed on the base cap and positioned on the base cap flanges. At least three end cap holes are formed on the end cap, positioned on the end cap flanges, and in axial alignment with the base cap holes. The number of the end cap holes corresponds to the number of the base cap holes, i.e., three or more. Through bolts are inserted into the base cap holes and the end cap holes for fastening the base cap flanges to the end cap flanges. Through bolt are provided according to the number of the base cap holes and the end cap holes (i.e., three or more through bolts are provided).

As described above, the base cap and the end cap are fastened by using three or more through bolts. Therefore, for example, in comparison to a rotating electric machine where only two through bolts are used for the fastening of the base cap and the end cap, the axial force experienced by each individual through bolts may be decreased when using three or more through bolts. In such a manner, the outer diameter of the through bolt can be decreased, and the maximum outer diameter of the rotating electric machine can be decreased. Therefore, the volume and/or size of the rotating electric machine can also be reduced.

Further, since the base cap and the end cap are fastened with three or more through bolts in the present disclosure, the axial force for fastening the base cap and the end cap is evenly distributed around the circumference of the base cap and the end cap. Therefore, highly accurate coaxial positioning of the base cap and the end cap is achieved for the precise locating of the shaft within the base cap and the end cap. In such a manner, the airgap between the rotor and the stator is decreased or minimized, which may increase the output of the rotating electric machine.

Moreover, when the base cap holes and end cap holes are formed at equiangular intervals around the circumference of the base cap and the end cap, the axial force for fastening is more evenly applied along the circumference of the base cap and the end cap. Therefore, the airgap between the rotor and the stator is further reduced, which may increase the output of the rotating electric machine.

Still further, since the rotating electric machine of the present disclosure has three or more through bolts for fastening the base cap and the end cap, even when the rotating electric machine is vibrated during operation as the driving source of the electric power steering device in a vehicle, the stress from such vibration is distributed through the three or more fastening positions of the through bolts, thereby reducing a per-fastening-position stress. Thus, the size of the base cap flanges and the end cap flanges may be reduced, and the volume and/or size of the rotating electric machine may also be reduced.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

Figure 1:
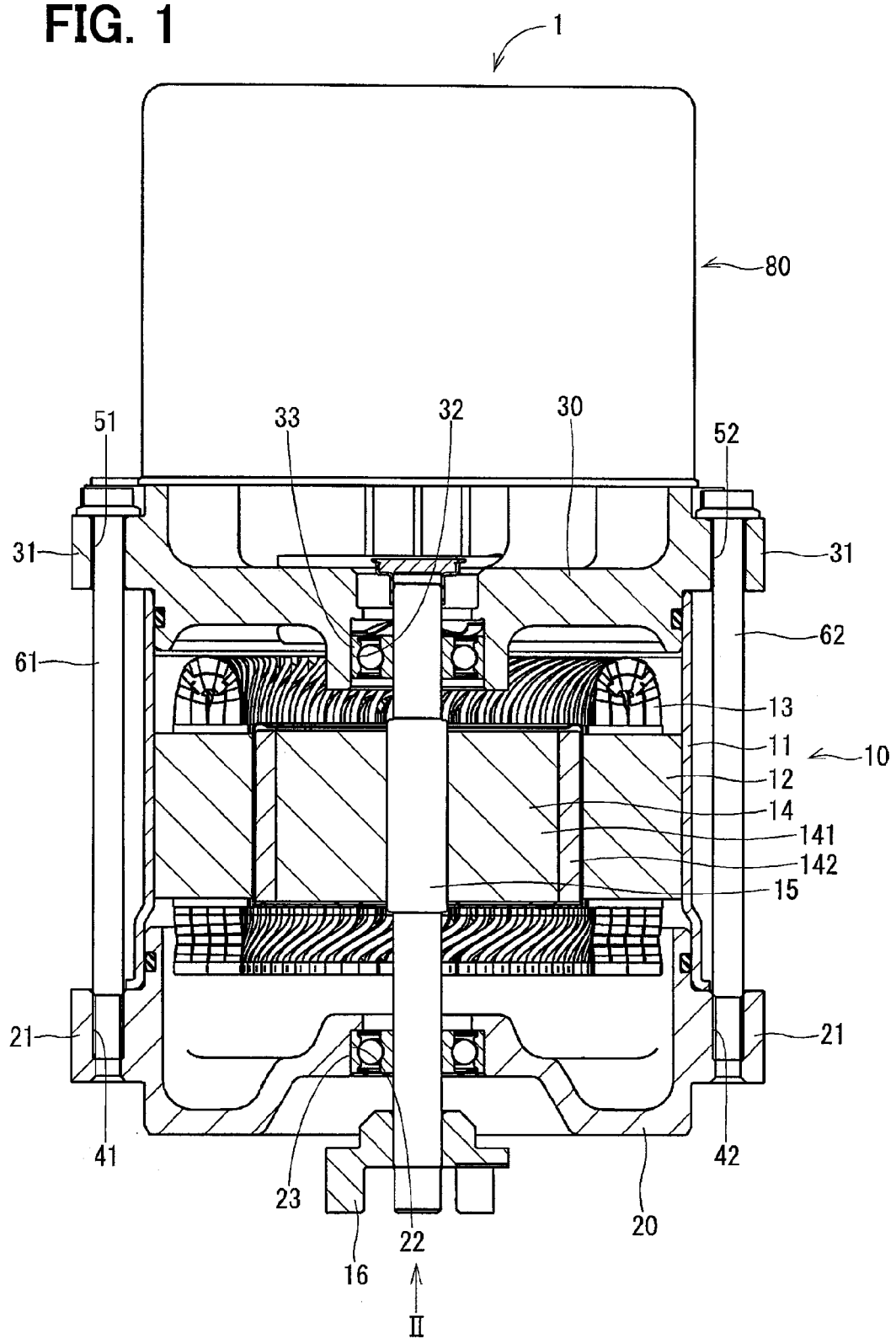
FIG. 1 is a cross section of a rotating electric machine in a first embodiment of the present disclosure.

Plural embodiments regarding the rotating electric machine of the present disclosure are described with reference to the drawing, together with the power steering apparatus using such rotating electric machine. In those embodiments, like parts have like numbers for the brevity of description.

(First Embodiment)

Figure 2:
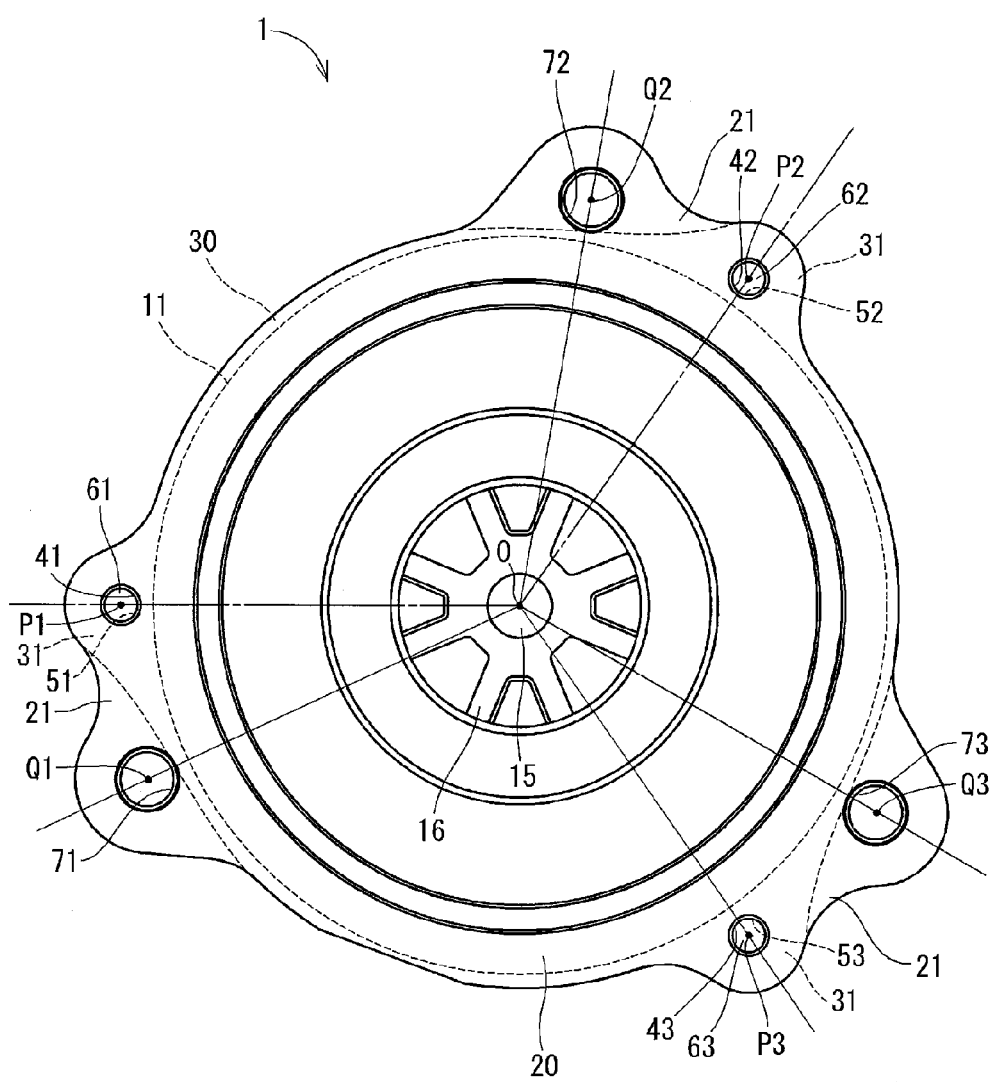
FIG. 2 is a view of the rotating electric machine of FIG. 1 from the direction of arrow II.

FIG. 1 and FIG. 2 illustrate the first embodiment of the rotating electric machine in the present disclosure. A rotating electric machine 1 is driven by receiving a supply of electric power and is used in an electric power steering apparatus to assist a steering operation of a vehicle, for example.

Figure 3:
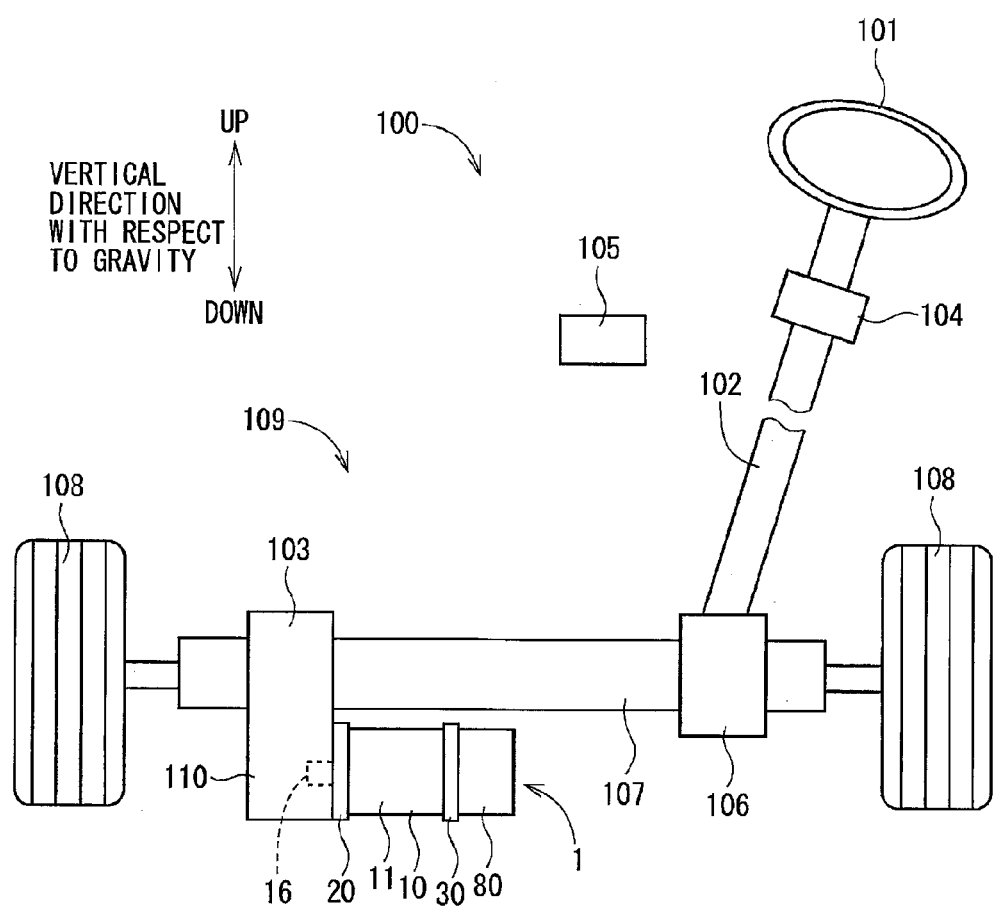
FIG. 3 is a schematic view of an electric power steering device applied to the rotating electric machine in the first embodiment of the present disclosure.

FIG. 3 shows a system configuration of a steering system 100 having an electric power steering apparatus 109. In the electric power steering apparatus 109, a torque sensor 104 is disposed on a steering shaft 102 and connected to a steering wheel 101. The torque sensor 104 detects a steering torque inputted into the steering shaft 102 from the steering wheel 101 by a vehicle driver.

A pinion gear 106 is disposed on an end of the steering shaft 102, and the pinion gear 106 is engaged with a rack axis 107. On both ends of the rack axis 107, a pair of tires 108 is connected in a rotatable manner through a tie rod or the like.

In such a manner, when the vehicle driver rotates the steering wheel 101, the steering shaft 102 connected to the steering wheel 101 rotates, and the rotation motion of the steering shaft 102 is converted to a linear motion of the rack axis 107 by the pinion gear 106, and the pair of tires 108 are steered by an angle proportional to an amount of the linear motion of the rack axis 107.

The electric power steering apparatus 109 includes the rotating electric machine 1 for generating a steering-assist torque, a reduction gear 103 for reducing a rotation speed of the rotating electric machine 1 and the like. In the present embodiment, the rotating electric machine 1 is disposed on a housing 110 of the reduction gear 103.

The rotating electric machine 1 is, for example, a three-phase brushless motor, and is driven by receiving a supply of an electric power from a battery (not shown). The rotating electric machine 1 provides a forward/reverse rotation for the reduction gear 103. The reduction gear 103 corresponds to a "drive object" in claims. The electric power steering apparatus 109 includes the above-described torque sensor 104 and a vehicle speed sensor 105 for detecting a vehicle speed.

By having such configuration, the electric power steering apparatus 109 generates a steering-assist torque to assist a steering of the steering wheel 101 by using the rotating electric machine 1 according to a signal from the torque sensor 104, a signal from the speed sensor 105 and the like, and transmits the generated torque to the steering shaft 102 via the reduction gear 103. In the present embodiment, the electric power steering apparatus 109 is a rack-assist type electric power steering apparatus as described above.

As shown in FIG. 1 and FIG. 2, the rotating electric machine 1 has a motor part 10 and a control part 80. The rotating electric machine 1 includes as the motor part 10, a motor case 11, a stator 12, a winding 13, a rotor 14, a shaft 15, a base cap 20, an end cap 30, an output rod 16, base cap holes 41, 42, 43, end cap holes 51, 52, 53, through bolts 61, 62, 63 and the like.

The motor case 11 is, for example, formed substantially in the shape of a cylinder from a material such as metal. The stator 12 is, for example, formed substantially in the shape of a cylinder from a material such as metal, (e.g. iron or the like), and is fixedly disposed inside of the motor case 11. The winding 13 is wound on the stator 12.

The rotor 14 has a rotor core 141 and a magnet 142. The rotor core 141 is, for example, formed substantially in the shape of a cylinder from a material such as metal, and is coaxially disposed inside of the stator 12. The magnet 142 is formed substantially in the shape of a cylinder, and is disposed on an outer wall of the rotor core 141. The shaft 15 is formed in the shape of a rod from a material such as metal and is disposed at a center of the rotor 14 such that the shaft 15 is connected to the rotor 14.

The base cap 20 is, for example, formed substantially in the shape of a disk from a material such as metal and is disposed to cover a first end of the motor case 11. The base cap 20 has base cap flanges 21 disposed around an outer periphery of the base cap 20. The base cap flanges 21 protrude radially-outwardly from an outer wall of the motor case 11. In the present embodiment, the base cap 20 has three base cap flanges 21 provided substantially at equiangular intervals circumferentially around the base cap 20.

A first shaft hole 22 is formed at a center of the base cap 20. A first end of the shaft 15 is inserted into the first shaft hole 22, as shown in FIG. 1. A bearing 23 is installed in the first shaft hole 22. The bearing 23 supports a first end of the shaft 15. In other words, the first end of the shaft 15 is supported within the base cap 20 by the bearing 23.

The end cap 30 is, for example, formed substantially in the shape of a disk from a material such as metal and is disposed to cover a second end of the motor case 11. The end cap 30 has end cap flanges 31 disposed around an outer periphery of the end cap 30. The end cap flanges 31 protrude radially-outwardly from the outer wall of the motor case 11 and correspond to the base cap flanges 21 of the base cap 20. In the present embodiment, the end cap 30 has three end cap flanges 31 provided substantially at equiangular intervals circumferentially around the end cap 30.

A second shaft hole 32 is formed at a center of the end cap 30. A second end of the shaft 15 is inserted into the second shaft hole 32, as shown in FIG. 1. The second end of the shaft 15 is opposite the first end of the shaft 15. The second shaft hole 32 has a bearing 33 installed thereon. The bearing 33 supports the second end of the shaft 15. In other words, the second end of the shaft 15 is supported within the end cap 30 by the bearing 33.

With the above configuration, the rotor 14 is rotatably disposed inside of the stator 12, together with the shaft 15. An airgap is defined between an outer wall of the rotor 14 (i.e., the magnet 142) and an inner wall of the stator 12.

The output rod 16 is formed from a material such as metal, for example, and is disposed on the first end of the shaft 15. More practically, the output rod 16 is disposed on an exposed portion of the shaft 15 outside of the base cap 20 and in a direction opposite to the end cap 30. The output rod 16 has four protrusions extending in an axial direction of the shaft 15. The four protrusions of the output rod 16 engage an input part of the reduction gear 103 to connect the shaft 15 to the reduction gear 103. Therefore, the output rod 16 outputs the rotation of the rotor 14 and the shaft 15 to the reduction gear 103.

The base cap holes 41, 42, 43 are formed respectively on the base cap flanges 21. The base cap holes 41, 42, 43 are formed as boreholes on the base cap flanges 21 and extend through the base cap flanges 21.

The end cap holes 51, 52, 53 are formed respectively on the end cap flanges 31 in axial alignment with the base cap holes 41, 42, 43. The end cap holes 51, 52, 53 are formed as boreholes on the end cap flanges 31 and extend through the end cap flanges 31.

The through bolts 61, 62, 63 are inserted into the base cap holes 41, 42, 43 and the end cap holes 51, 52, 53 to fasten the base cap 20 to the end cap 30. In such a manner, with the motor case 11 bound by the base cap 20 and the end cap 30, a predetermined axial force is applied to each of fastening positions around the base cap flanges 21 and the end cap flanges 31 by the through bolts 61, 62, 63.

In the present embodiment, mounting holes 71, 72, 73 are formed on each of the base cap flanges 21 as shown in FIG. 2. In other words, mounting holes 71, 72, 73 are formed a distance from the base cap holes 41, 42, 43 on the base cap flanges 21.

Mounting bolts (not illustrated) are inserted into the mounting holes 71, 72, 73 to fasten the base cap flanges 21 to the housing 110 of the reduction gear 103. In such a manner, the rotating electric machine 1 is installed on the housing 110 of the reduction gear 103. In the present embodiment, the rotating electric machine 1 is installed on the housing 110 as shown in FIG. 3 so that a center axis of the motor case 11 is positioned perpendicular to the vertical direction with respect to gravity In the present embodiment, the base cap holes 41, 42, 43 are positioned substantially at equiangular intervals circumferentially around the base cap 20. Referring to FIG. 2, the base cap 20 has an axial center O. When the centers of the base cap holes 41, 42, 43 are respectively designated as P1, P2, P3, base cap hole separation angles P1OP2, P2OP3, P3OP1 with respect to the axial center O are each approximately 120 degrees, respectively. In other words, the angle between the base cap holes 41, 42 with respect to the axial center O is approximately 120 degrees, the angle between the base cap holes 42, 43 with respect to the axial center O is approximately 120 degrees, and the angle between the base cap holes 43, 41 with respect to the axial center O is approximately 120 degrees, respectively.

Further, the mounting holes 71, 72, 73 are positioned substantially at equiangular intervals circumferentially around the base cap 20. When center points of the mounting holes 71, 72, 73 are respectively designated as Q1, Q2, Q3, mounting hole separation angles Q1OQ2, Q2OQ3, Q3OQ1 with respect to the axial center O are each approximately 120 degrees, respectively. In other words, the angle between the mounting holes 71, 72 with respect to the axial center O is approximately 120 degrees, the angle between the mounting holes 72, 73 with respect to the axial center O is approximately 120 degrees, and the angle between the mounting holes 73, 71 with respect to the axial center O is approximately 120 degrees, respectively.

The control part 80 is disposed on a side of the end cap 30 opposite to the motor case 11, and is connected to the motor part 10 such that the motor part 10 and the control part 80 are a single body. That is, the control part 80 is disposed on the opposite side of the output rod 16 relative to the motor case 11.

The control part 80 includes electronic components such as a power module, a microcomputer and the like for realizing an inverter. The control part 80 controls a power supply for the winding 13 based on a signal from the torque sensor 104 and a signal from the vehicle speed sensor 105. When a power supply is provided for the winding 13 by the control part 80, a rotating magnetic field is generated by the stator 12. By receiving the rotating magnetic field, the rotor 14 rotates with the shaft 15, and a rotation of the rotor 14 is output from the output rod 16. The rotating electric machine 1 is a mechanism and controller contained in a single body type rotating electric machine, having the motor part 10 and the control part 80 for controlling the motor part 10 combined to have a single body.

As described above, three through bolts 61, 62, 63 are used in the present embodiment for fastening the end cap 30 to the base cap 20. Therefore, the axial force experienced by each through bolts 61, 62, 63 is lower, in comparison to the structure of a rotating electric machine having only two through bolts used for fastening the end cap 30 to the base cap 20. Thus, the outer diameter of each through bolts 61, 62, 63 may be reduced, thereby enabling a reduction of the maximum outer diameter of the rotating electric machine 1. As a result, a reduction of the volume and/or size of the rotating electric machine 1 may also be achieved.

Moreover, by fastening the end cap 30 to the base cap 20 with three through bolts 61, 62, 63, the axial force for fastening the base cap 20 and the end cap 30 is more evenly distributed around the circumference of the base cap 20 and the end cap 30, relative to fastening the base cap 20 and the end cap 30 with only two through bolts. Therefore, the highly accurate coaxial positioning of the base cap 20 and the end cap 30 is achieved for the precise positioning of the shaft 15 between the base cap 20 and the end cap 30. In such a manner, the airgap between the rotor 14 and the stator 12 is decreased or minimized, which may increase the output of the rotating electric machine 1.

The base cap holes 41, 42, 43 are formed at equiangular intervals around the circumference of the base cap 20. When the base cap holes 41, 42, 43 are formed at equiangular intervals around the circumference of the base cap 20, the axial force for fastening the base cap 20 with the end cap 30 is more evenly distributed among the three through bolts 61, 62, 63 in the circumferential direction of the base cap 20 and the end cap 30. Therefore, the airgap between the rotor 14 and the stator 12 is decreased or minimized, for the increase of the output of the rotating electric machine 1.

The mounting holes 71, 72, 73 are provided on the base cap flanges 21 for fastening the housing 110 of the reduction gear 103 to the base cap flanges 21 by inserting the mounting bolts into the mounting holes 71, 72, 73. In such a manner, the rotating electric machine 1 is disposed in a vehicle to be used as a driving source of the electric power steering device 109. Further, in the present embodiment, the rotating electric machine 1 fastened on the housing 110 is stably fastened and supported by the three mounting bolts.

Further, since the rotating electric machine 1 of the present disclosure has three through bolts 61, 62, 63 for fastening the base cap 20 and the end cap 30, even if the rotating electric machine 1 vibrates while generating the drive force of the electric power steering device 109 in a vehicle, the stress from such vibration is divided and distributed to three fastening positions around the base cap 20 and the end cap 30 by the three through bolts 61, 62, 63, thereby achieving a reduction of a per-fastening-position stress. Thus, the base cap flanges 21 and the end cap flanges 31 are reduced in size, and the volume and/or size of the rotating electric machine 1 is also reduced.

The mounting holes 71, 72, 73 are formed near the base cap holes 41, 42, 43. Therefore, by reducing the respective distances between the mounting positions of the mounting bolts and the fastening positions of the through bolts 61, 62, 63, deformation of the base cap flanges 21 due to the weight and vibration of the rotating electric machine 1 is reduced, which may also reduce the stress on the base cap 20. As a result, an increase in the volume and/or size of the base cap flanges 21 of the base cap 20 is prevented.

The mounting holes 71, 72, 73 are formed at equiangular intervals around the circumference of the base cap 20. In such a manner, the rotating electric machine 1 is securely fastened to the housing 110 of the reduction gear 103.

The control part 80 is provided on a side of the end cap 30 opposite the base cap 20 and provides a power supply for the winding 13. In other words, the rotating electric machine 1 is provided as a mechanism and controller contained in a single body type rotating electric machine. Therefore, within the limited installation space inside of a vehicle, the motor part 10 is positioned close to the control part 80. Further, the force and/or moment as a result of the control part 80 being positioned a distance from the mounting position to the housing 110 may increase the amount of stress at the mounting positions when the rotating electric machine 1 vibrates or when the vehicle is in motion. However, in the present embodiment, the rotating electric machine 1 is fastened on the housing 110 by the three mounting bolts 71, 72, 73 which may reduce the stress at each mounting position. Therefore, an increase in the volume and/or size of the base cap flanges 21 is prevented.

(Second Embodiment)

Figure 4:
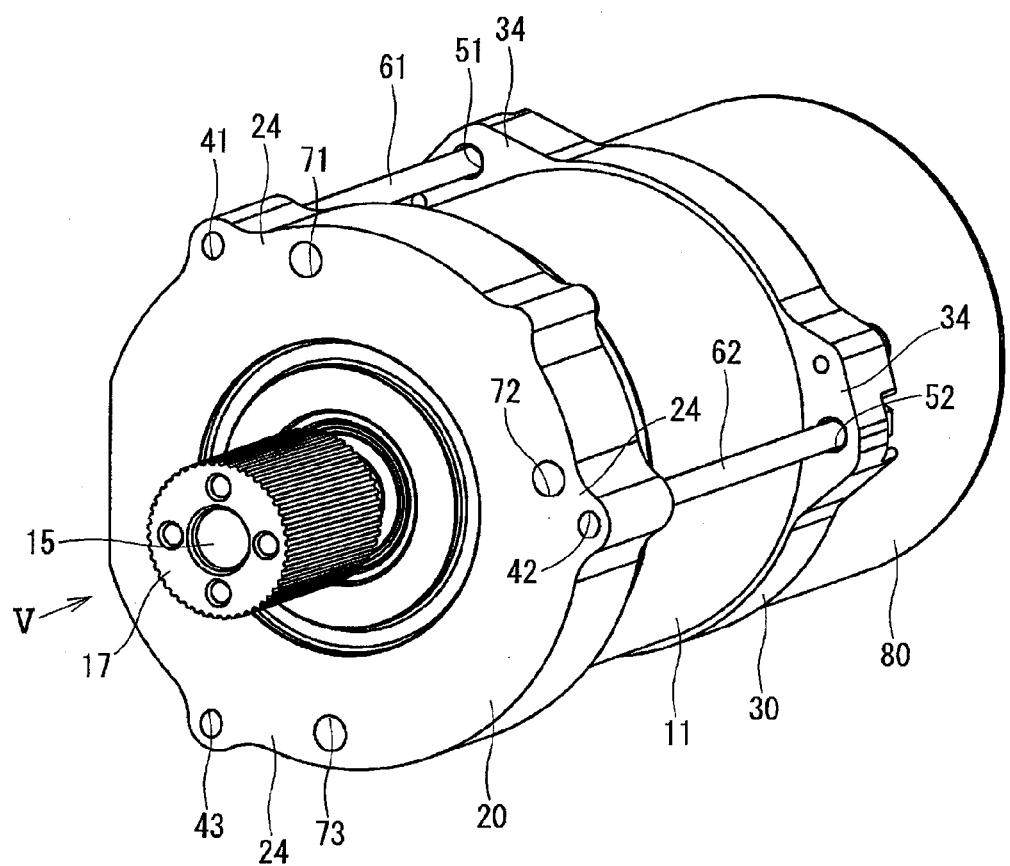
FIG. 4 is a perspective view of the rotating electric machine in a second embodiment of the present disclosure.
Figure 5:
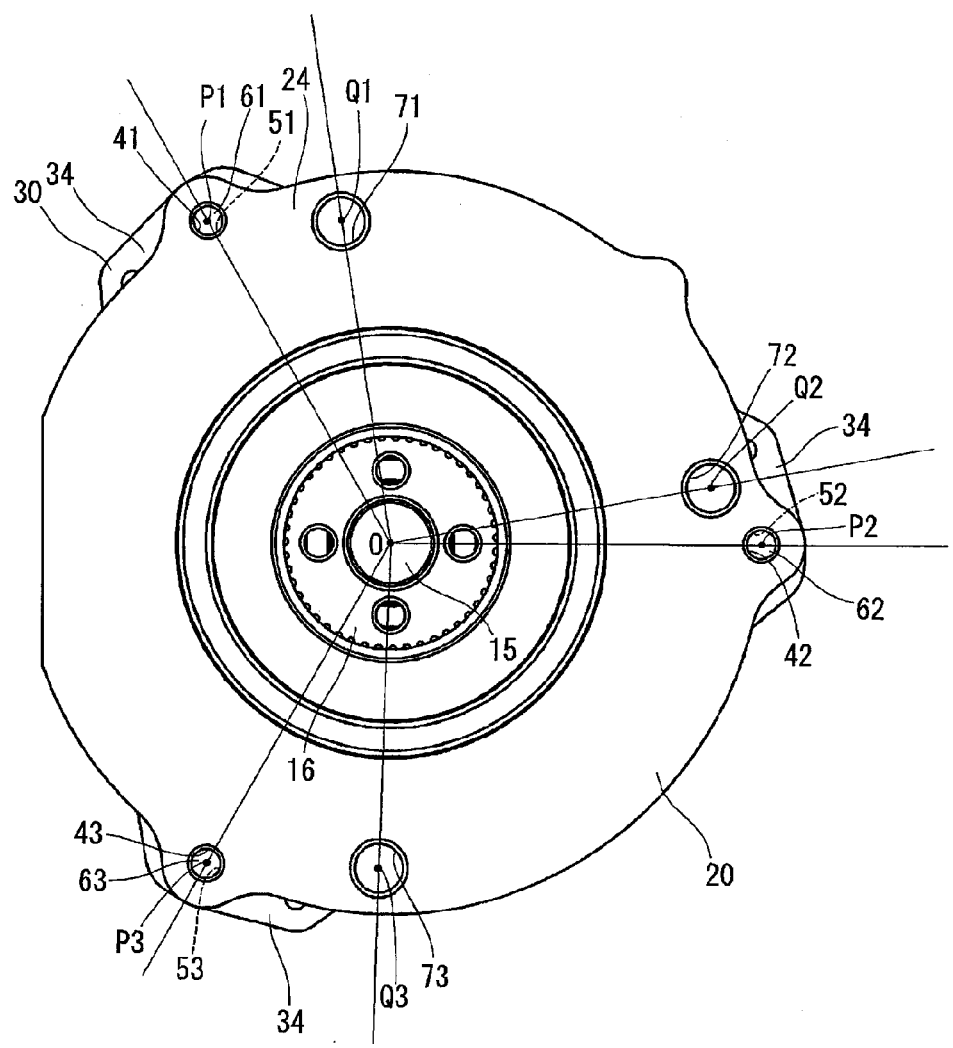
FIG. 5 is a view of the rotating electric machine of FIG. 4 from the direction of arrow V.

FIG. 4 and FIG. 5 illustrate a second embodiment of the rotating electric machine in the present disclosure.

Referring to FIG. 4, the output rod 17 is substantially cylindrical in shape, and is coaxially disposed on the first end of the shaft 15. A plurality of grooves extending in an axial direction is formed on an outer wall of the output rod 17. The output rod 17 and an input part (not shown) of the reduction gear 103 are connected by a belt. The belt transfers the rotation of the rotor 14 to the reduction gear 103.

A first base cap hole 41, a second base cap hole 42, and a third base cap hole 43 are formed on three base cap flanges 24. More practically, the first base cap hole 41, the second base cap hole 42, and the third base cap hole 43 are formed at equidistant positions (i.e., at equiangular intervals) about the axial center O around the circumference of the base cap 20. The axial center O is aligned with the axial centers of the first shaft hole 22 and the second shaft hole 32.

A first mounting hole 71 is positioned adjacent to the first base cap hole 41, a second mounting hole 72 is positioned adjacent to the second base cap hole 42, and a third mounting hole 73 is positioned adjacent to the third base cap hole 43. More practically, the first mounting hole 71, the second mounting hole 72, and the third mounting hole 73 are formed at non-equidistant positions (i.e., not at the same intervals) about the axial center O around the circumference direction of the base cap 20. The arrangement of the first, second, and third mounting holes 71, 72, 73 around the base cap 20 may depend upon the fastening constraints resulting from the fastening of the reduction gear 103 onto the housing 110 (i.e., due to the positions of the mounting bolts).

Formation positions of the first, second, and third mounting holes 71, 72, 73 and the first, second, and third base cap holes 41, 42, 43 are described with reference to FIG. 5 and more practically in the following.

In the present embodiment, the first mounting hole 71, the axial center O, and the second mounting hole 72 define a first mounting hole separation angle Q1OQ2. The second mounting hole 72, the axial center O, and the third mounting hole 73 define a second mounting hole separation angle Q2OQ3. The third mounting hole 73, the axial center O, and the first mounting hole 71 define a third mounting hole separation angle Q3OQ1. The first base cap hole 41, the axial center O, and the first mounting hole 71 define a first difference angle P1QO1. The second base cap hole 42, the axial center O, and the second mounting hole 72 define a second difference angle P2OQ2. The third base cap hole 43, the axial center O, and the third mounting hole 73 define a third difference angle P3OQ3.

The first mounting hole 71, the second mounting hole 72, and the third mounting hole 73 are positioned about the axial center O such that the third mounting hole separation angle Q3OQ1 is greater than both the first mounting hole separation angle Q1OQ2 and the second mounting hole separation angle Q2OQ3. In addition, the second mounting hole separation angle Q2OQ3 is greater than the first mounting hole separation angle Q1OQ2.

The first base cap hole 41 is formed at a position adjacent to the first mounting hole 71 within the third mounting hole separation angle Q3OQ1 and the third base cap hole 43 is formed at a position adjacent to the third mounting hole 73 also within the third mounting hole separation angle Q3OQ1. The second base cap hole 42 is positioned adjacent to the second mounting hole 72 within the second mounting hole separation angle Q2OQ3, such that the second difference angle P2OQ2 is different from the first difference angle P1OQ1 and the third difference angle P3OQ3. Three end cap flanges 34 are formed at positions corresponding to the three base cap flanges 24. The end cap holes 51, 52, 53 are respectively formed on the three end cap flanges 34 in axial alignment with the first, second, and third base cap holes 41, 42, 43. Therefore, the end cap holes 51, 52, 53 are formed substantially equidistant (i.e., at equiangular intervals) around the circumference of the end cap 30.

As described above, the first, second, and third mounting holes 71, 72, 73 in the present embodiment are arranged in non-equiangular intervals around the circumference of the base cap 20.

The first base cap hole 41 is positioned adjacent to the first mounting hole 71 within the third mounting hole separation angle Q3OQ1 and the third base cap hole 43 is positioned adjacent to the third mounting hole 73 within the third mounting hole separation angle Q3OQ1. Further, the second base cap hole 42 is positioned adjacent to the second mounting hole 72 and within the second mounting hole separation angle Q2OQ3. The second base cap hole 42 forms a second difference angle P2OQ2 that is not equal to the first difference angle P1OQ1 or the third difference angle P3OQ3, such that the third mounting hole separation angle Q3OQ1 is greater than the second mounting hole separation angle Q2OQ3 and the second mounting hole separation angle Q2OQ3 is greater than the first mounting hole separation angle Q1OQ2.

As a result of the above arrangement, even when the first, second, and third mounting holes 71, 72, 73 are arranged non-equidistantly (i.e., not at equiangular intervals) around the circumference of the base cap 20, the first, second, and third base cap holes 41, 42, 43 may still be arranged equidistantly (i.e., at equiangular intervals) around the circumference of the base cap 20. Therefore, the second embodiment achieves substantially the same advantageous effects as the first embodiment in which the base cap holes 41, 42, 43 of the first embodiment are formed substantially at the same intervals around the base cap 20.

(Third Embodiment)

Figure 6:
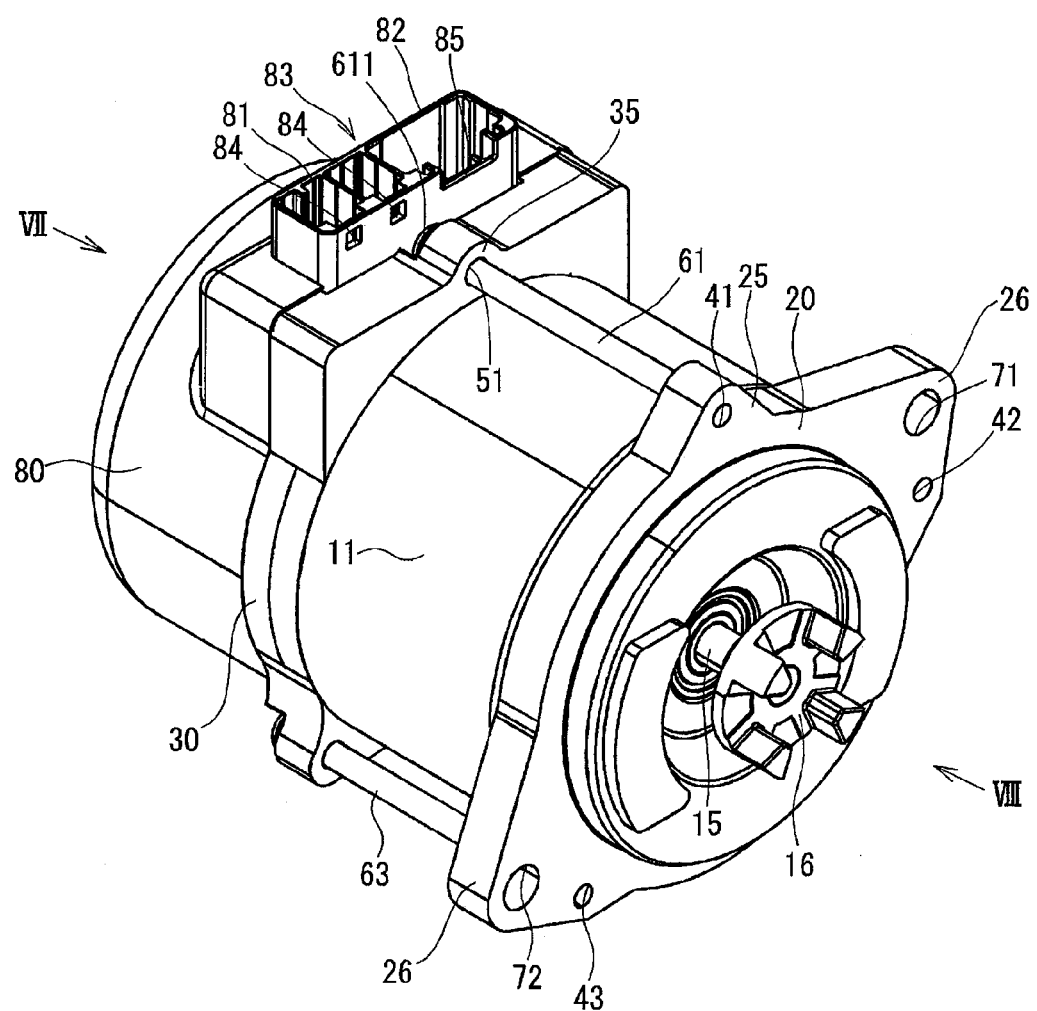
FIG. 6 is a perspective view of the rotating electric machine in a third embodiment of the present disclosure.
Figure 7:
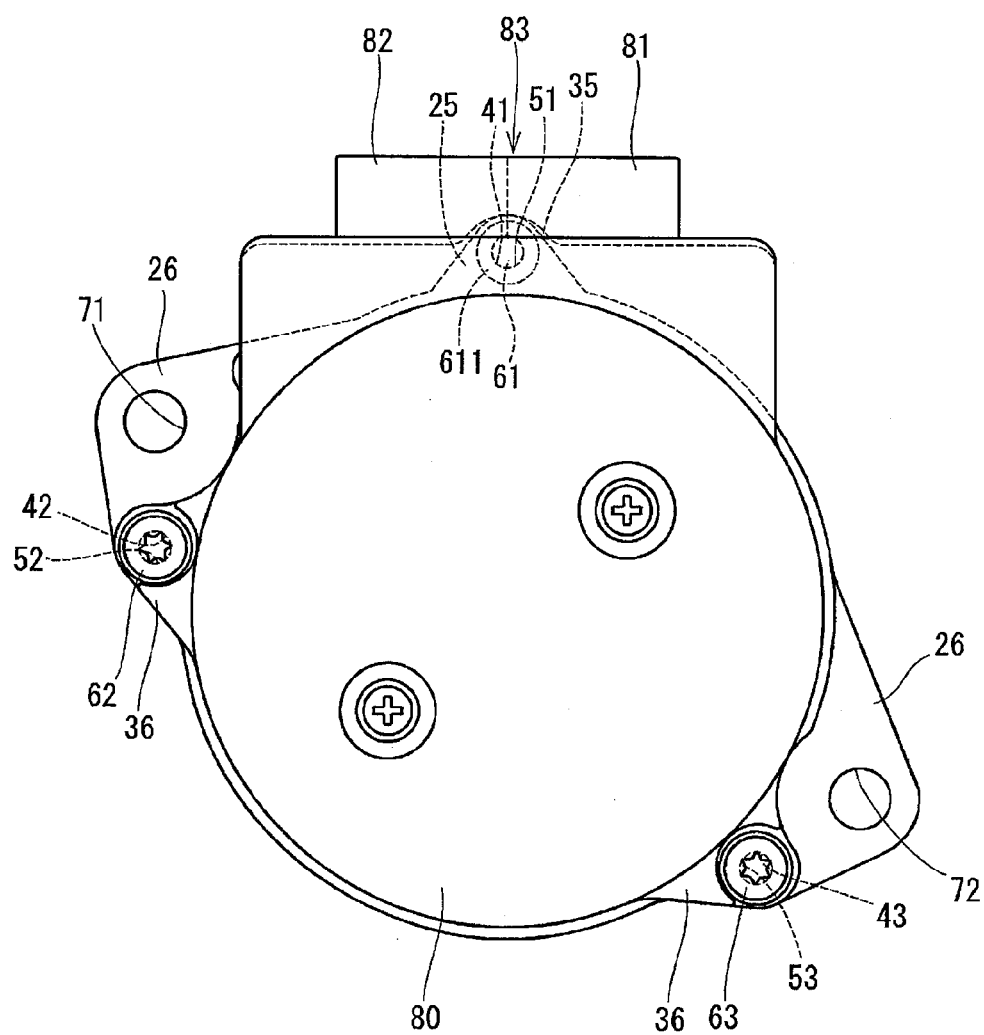
FIG. 7 is a view of the rotating electric machine of FIG. 6 from the direction of arrow VII.
Figure 8:
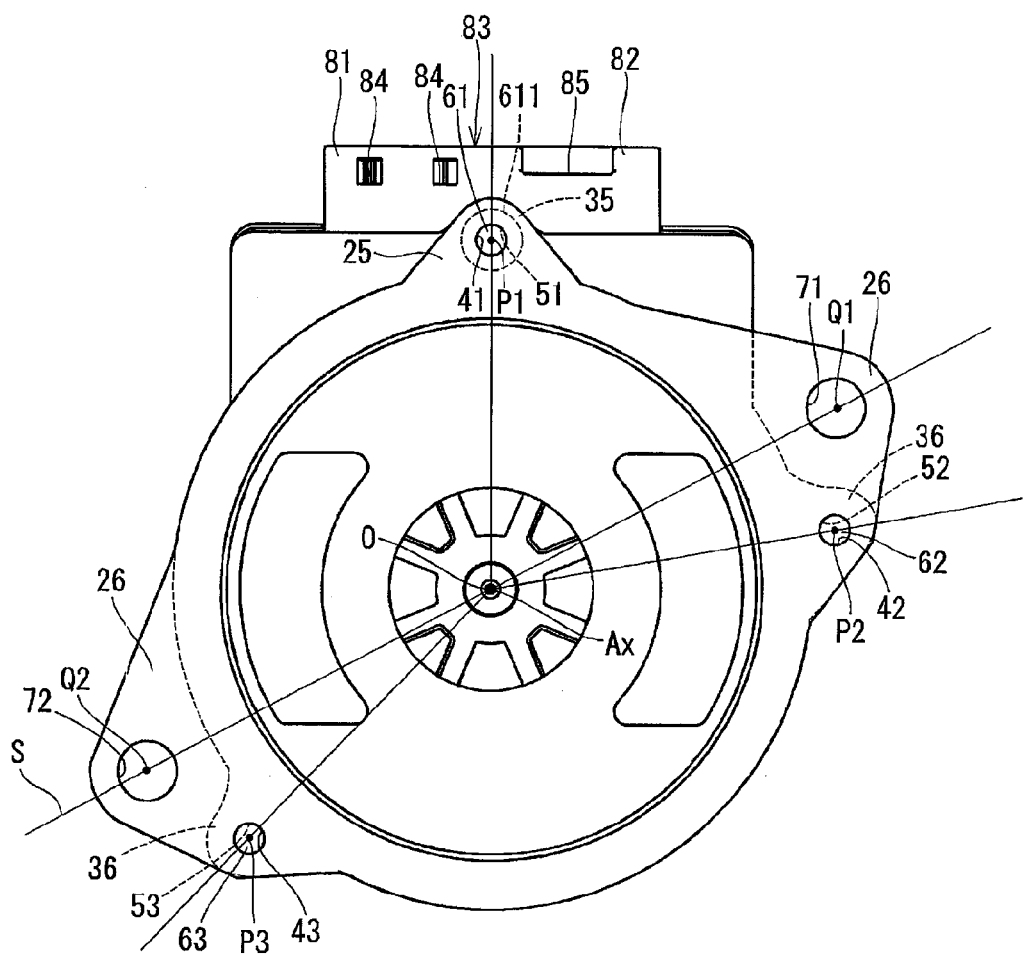
FIG. 8 is a view of the rotating electric machine of FIG. 6 from the direction of arrow VIII.

FIG. 6, FIG. 7, and FIG. 8 illustrate a third embodiment of the rotating electric machine in the present disclosure.

As shown in FIGS. 6-8, a first base cap flange 25 having a triangular shape and second base cap flanges 26 are provided in the present embodiment. The second base cap flanges 26 are symmetric and positioned along a center line of the base cap 20, on an outer periphery of the base cap 20. In other words, each second base cap flange 26 is opposite the other along the center line, (i.e., positioned at about 180 degrees from each other). Therefore, the first base cap flange 25 and the second base cap flanges 26 are positioned at non-equiangular intervals around the circumference of the base cap 20.

A first base cap hole 41 is formed on the first base cap flange 25. A second base cap hole 42 is formed on one of the second base cap flanges 26 while a third base cap hole 43 is formed on the other of the second base cap flanges 26, as illustrated in FIG. 8.

In the present embodiment, a first mounting hole 71 is formed adjacent to a second base cap hole 42 and a second mounting hole 72 is formed adjacent to a third base cap hole 43. The first and second mounting holes 71, 72 are formed substantially at an equiangular interval around the circumference of the base cap 20, (i.e., positioned at about 180 degrees from each other). In other words, the first and second mounting holes 71, 72 define a separation angle Q1OQ2 of about 180 degrees.

Formation positions of the first, second, and third base cap holes 41, 42, 43 are more practically described with reference to the drawing in FIG. 8.

A virtual plane S is defined by the first and second mounting holes 71, 72, and a center axis Ax of the motor case 11. The first base cap hole 41 is positioned on one side of the virtual plane S. The second and third base cap holes 42, 43 are positioned on the opposite side of the virtual plane S and the second base cap hole 42 is positioned adjacent to the first mounting hole 71 and the third base cap hole 43 is positioned adjacent to the second mounting hole 72.

A first end cap flange 35 is formed at a position corresponding to the first base cap flange 25. Second end cap flanges 36 are formed at positions corresponding to the second base cap flanges 26. The end cap holes 51, 52, 53 are respectively formed at positions on the first end cap flange 35 and the second end cap flanges 36 such that the end cap holes 51, 52, 53 are in axial alignment with the first, second, and third base cap holes 41, 42, 43.

In the present embodiment, the rotating electric machine is provided with a signal connector 81 and a power supply connector 82. The signal connector 81 is made of resin, for example, and extends from the control part 80 in a radially-outward direction relative to the motor case 11. The signal connector 81 is positioned adjacent to the first end cap flange 35. The signal connector 81 is connected to a wire harness (not illustrated) for receiving signals, that is, a signal wire harness for receiving control signals for inputting into the control part 80, including a signal from the torque sensor 104, a signal of an ignition voltage, and other signals such as a CAN signal.

The power supply connector 82 extends from the control part 80 in a radially-outward direction relative to the motor case 11. The power supply connector 82 is connected to a power supply wire harness and receives a driving electric current (i.e., an electric current flowing to the winding 13). The signal connector 81 and the power supply connector 82 are positioned side-by-side on a tangential edge along the outer wall of the motor case 11 and serve as an aggregated connector 83.

Holes 84 are formed on a side of the signal connector 81 facing towards the motor case 11. When a connector of the signal wire harness is connected to the signal connector 81, release tabs of the connectors for the signal wire harness engage the holes 84. A slot 85 is also formed on a side of the power supply connector 82 facing towards the motor case 11. When a connector of the power supply wire harness is connected to the power supply connector 82, an alignment tab of the connector of the power supply wire harness may engage the slot 85.

As shown in FIGS. 6-8, the end cap hole 51 is formed on a side of the virtual plane S, that is, within one of two areas separated by the virtual plane S. The end cap hole 51 is positioned in axial alignment with the base cap hole 41, adjacent to a side of at least one of the signal connector 82 or the power supply connector 82 of the aggregated connector 83, and on the side of the aggregated connector 83 opposite to the control part 80. As illustrated in FIG. 7, the view of the end cap hole 51 is obstructed from view by at least one of the signal connector 81 or the power supply connector 82 of the control part 80 when viewing the motor case 11 along the center axis Ax of the motor case 11 from the second end of the motor case 11 to the first end of the motor case 11 (i.e., viewing the control part 80 along the axial direction of the motor case 11 toward the base cap 20).

Referring to FIG. 8, the end cap hole 51 is positioned between the signal connector 81 and the power supply connector 82. Further, as a matter of course, the end cap hole 51 within the first end cap flange 35 is formed between the signal connector 81 and the power supply connector 82. Therefore, a head 611 of a first through bolt 61 is positioned between the signal connector 81 and the power supply connector 82.

Further, since the end cap hole 51 and the first end cap flange 35 are positioned between the signal connector 81 and the power supply connector 82, the view of the hole part 84 on the signal connector 81 and the view of the cutout part 85 on the power supply connector 82 is not obstructed by the first end cap flange 35 or by the head 611 of the through bolt 61 when viewing the base cap 20 along the axial direction of the motor case 11 towards the signal connector 81. Therefore, during vehicle assembly when the signal wire harness and the power supply wire harness are to be connected to the aggregated connector 83, the hole part 84 on the signal connector 81 and the cutout part 85 on the power supply connector 82 may be easily seen by an assembly worker.

As described above, the first and second mounting holes 71, 72 are formed at about 180 degrees from the along the circumference of the base cap 20, that is, on each of the second base cap flanges 26. The first, second, and third base cap holes 41, 42, 43 are distributed between both sides of the virtual plane S such that the first base cap hole 41 is on one side of the virtual plane S, and the second and third base cap holes 42, 43 are on the opposite side of the virtual plane S at positions adjacent to the first and second mounting holes 71, 72.

By such arrangement of the hole positions, the through bolts 61, 62, 63 are positioned relatively evenly. Therefore, the stress caused by shaking and vibration is almost evenly distributed between the first and second base cap flanges 25, 26 and the first and second end cap flanges 35, 36. Such an arrangement reduces individual high concentrations of stress which may allow a reduction in volume and/or size of the first and second base cap flanges 25, 26 and the first and second end cap flanges 35, 36.

Additionally, in the above structure, the first through bolt 61 is positioned on one side of the virtual plane S, and second and third through bolts 62, 63 are positioned on the opposite side of the virtual plane S. Therefore, even when the rotating electric machine is vibrated by a vibrating force that is perpendicular to the virtual plane S, an amplitude of such vibration, especially on the control part 80 side of the rotating electric machine 1, is reduced by the rigidity provided by the first through bolt 61 positioned on the opposite side of the virtual plane S relative to the second and third through bolts 62, 63 adjacent to the first and second mounting bolts 71, 72. Thus, the volume and/or size of the base cap 20 and the end cap 30 is reduced.

Moreover, the signal connector 81 is provided on the control part 80 extending radially-outward from the motor case 11 and receives control signals for the control part 80. The power supply connector 82 is provided on the control part 80 extending radially-outward from the motor case 11 and receives the electric current for the winding 13. Further, the end cap hole 51, which is axially aligned with the base cap hole 41 and formed on one side of the virtual plane S, is obstructed from view by the aggregated connector 83, that is a combination of the signal connector 81 and the power supply connector 82, when viewing the control part 80 along the center axis Ax of the motor case 11 toward the base cap 20, as illustrated in FIG. 7. In other words, the first end cap flange 35 having the end cap hole 51 does not extend radially beyond the extent of the aggregated connector 83. Thus, the first end cap flange 35 will not affect (i.e., will not increase) the maximum outer diameter of the rotating electric machine 1. That is, the volume and/or size of the rotating electric machine 1 may be reduced by the configuration of the present embodiment.

Still further, the end cap hole 51, which is in axial alignment with the first base cap hole 41 formed on one side of the virtual plane S, is positioned between the signal connector 81 and the power supply connector 82. Therefore, the head 611 of the through bolt 61 will be positioned between the signal connector 81 and the power supply connector 82. In such a manner, when the connector of the signal wire harness is inserted into the signal connector 81 and the connector of the power supply wire harness is inserted into the power supply connector 82, the hand of the assembly worker inserting those connectors is prevented from interfering with the head 611 of the through bolt 61. That is, the working environment and ease of assembly is improved by the configuration of the present embodiment.

Furthermore, since the end cap hole 51 and the first end cap flange 35 are formed between the signal connector 81 and the power supply connector 82, when viewing the base cap 20 along the axial direction of the motor case 11 towards the signal connector 81, a view of the hole part 84 on the signal connector 81 and a view of the cutout part 85 on the power supply connector 82 will not be obstructed by the first end cap flange 35 nor by the head 611 of the through bolt 61. Therefore, when the signal wire harness and the power supply wire harness are connected to the aggregated connector 83, the hole part 84 on the signal connector 81 and the cutout part 85 on the power supply connector 82 may be easily seen by an assembly worker. Therefore, whether the connector of the signal wire harness is securely connected to the signal connector 81 and whether the connector of the power supply wire harness is securely connected to the power supply connector 82 can easily be determined and/or confirmed. Thus, the quality control and verification process of the assembly work to confirm the connection of those wire harnesses is improved.

(Other Embodiments)

Although the present disclosure has been fully described in connection with the above embodiments with reference to the accompanying drawings, it is to be noted that various changes and modifications will become apparent to those skilled in the art.

In the above-described third embodiment, the signal connector and the power supply connector are formed to have a single aggregated body. However, in other embodiments, those connectors may have separate bodies. In a such case, the rear hole corresponding to the base cap hole formed on a side of the virtual plane including the two mounting holes and the center axis Ax, may be preferably formed at a position either behind the signal connector or behind the power supply connector when viewing the control part along the center axis Ax of the motor case toward the base cap. In such a manner, the maximum outer diameter of the rotating electric machine seen from the control part side will not be increased, thereby achieving a volume and/or size reduction of the rotating electric machine.

Further, in the other embodiments of the present disclosure, four or more base cap holes, end cap holes, and through bolts may be provided. In such a manner, the outer diameter of the through bolts may further be reduced, for further reducing the maximum outer diameter of the rotating electric machine. Further, four or more fastening hole parts may also be provided. In such a manner, the rotating electric machine is stably attached on the housing of the drive object, or the like.

Even further, in the above-described first and second embodiments, the motor part and the control part are combined to have a single body and are designated as a mechanism and controller contained in a single body type. However, in other embodiments of the present disclosure, the motor part and the control part may have separate bodies.

Moreover, in the above-described embodiment, the reduction gear is attached to the rack axis to transmit the drive power of the rotating electric machine to the rack axis (i.e., a rack-assist type). However, in the other embodiments of the present disclosure, the reduction gear may be attached to the steering shaft to transmit drive power of the rotating electric machine to the steering shaft (i.e., a column-assist type).

The rotating electric machine of the present disclosure is usable as a drive source of an apparatus other than the electric power steering apparatus.

Such changes and modifications are to be understood as being within the scope of the present disclosure as defined by the appended claims.

What is claimed is:

1. A rotating electric machine comprising:
   a motor case having a center axis and a cylinder shape with a first motor end and a second motor end, wherein the second motor end is opposite to the first motor end;

a stator housed in the motor case;
a winding wound on the stator;
a rotor rotatably disposed inside of the stator;
a shaft disposed at a rotation center of the rotor;
a base cap covering the first motor end of the motor case, having a first shaft hole at an axial center of the base cap for receiving the shaft, and base cap flanges formed on a circumferential edge of the base cap and extending radially-outward beyond an outer wall of the motor case;
an end cap covering the second motor end of the motor case, having a second shaft hole at an axial center of the end cap for receiving the shaft, and end cap flanges formed on a circumferential edge of the end cap and extending radially-outward beyond the outer wall of the motor case;
an output rod disposed on the shaft and connected to a drive object for outputting a rotation to the drive object;
three base cap holes formed on the base cap and positioned on the base cap flanges;
three end cap holes formed on the end cap, positioned on the end cap flanges, and in axial alignment with the base cap holes;
three through bolts inserted into the base cap holes and the end cap holes for fastening the base cap flanges to the end cap flanges;
at least two mounting holes formed on the base cap flanges;
at least two mounting bolts inserted into the mounting holes for attaching the base cap to a housing of the drive object;
a control part disposed on a side of the end cap opposite to the motor case and configured to control a power supply;
a signal connector extending from the control part in a radially-outward direction relative to the motor case and configured to receive control signals for input into the control part; and
a power supply connector extending from the control part in a radially-outward direction relative to the motor case and configured to receive an electric current, wherein
the mounting holes are formed at equiangular intervals around the base cap,
the mounting holes are positioned on the base cap flanges and include a first mounting hole and a second mounting hole,
the base cap holes include a first base cap hole, a second base cap hole, and a third base cap hole,
the first base cap hole is positioned on a first side of a virtual plane defined by the first mounting hole, the second mounting hole, and the center axis of the motor case,
the second base cap hole and the third base cap hole are positioned on a side opposite the first side of the virtual plane such that the second base cap hole is positioned adjacent to the first mounting hole and the third base cap hole is positioned adjacent to the second mounting part, and
one of the three end cap holes is positioned in axial alignment with the first base cap hole and is positioned adjacent to a side of at least one of the signal connector or the power supply connector such that the one of the three end cap holes is obstructed from view by the at least one of the signal connector or the power supply connector when viewing the motor case along the center axis of the motor case from the second motor end to the first motor end, and
an angle between the second base cap hole and one of the mounting holes is the same as an angle between the third base cap hole and another one of the mountin holes with reference to the virtual plane.

2. The rotating electric machine in claim 1, wherein the base cap holes are formed at equiangular intervals around a circumference of the base cap.

3. The rotating electric machine in claim 1, wherein the mounting holes are positioned adjacent to the base cap holes.

4. The rotating electric machine in claim 1, wherein the signal connector and the power supply connector are formed having a single body, and
the one of the three end cap holes corresponding to the first based cap hole that is positioned on the first side of the virtual plane is positioned between the signal connector and the power supply connector.

5. The rotating electric machine in claim 1, wherein the at least two mounting holes are arranged at different angular intervals around the base cap.

6. An electric power steering device comprising:
a motor case having a center axis and a cylinder shape with a first motor end and a second motor end, wherein the second motor end is opposite to the first motor end;
a stator housed in the motor case;
a winding wound on the stator;
a rotor rotatably disposed inside of the stator;
a shaft disposed at a rotation center of the rotor;
a base cap covering the first motor end of the motor case, having a first shaft hole at an axial center of the base cap for receiving the shaft, and base cap flanges formed on a circumferential edge of the base cap and extending radially-outward beyond an outer wall of the motor case;
an end cap covering the second motor end of the motor case, having a second shaft hole at an axial center of the end cap for receiving the shaft, and end cap flanges formed on a circumferential edge of the end cap and extending radially-outward beyond the outer wall of the motor case;
an output rod disposed on the shaft and connected to a drive object for outputting a rotation to the drive object wherein the driving of the drive object enables an output of an assist torque for assisting a steering operation of the electric power steering device;
three base cap holes formed on the base cap and positioned on the base cap flanges;
three end cap holes formed on the end cap, positioned on the end cap flanges, and in axial alignment with the base cap holes;
three through bolts inserted into the base cap holes and the end cap holes for fastening the base cap flanges to the end cap flanges;
at least two mounting holes formed on the base cap flanges;
at least two mounting bolts inserted into the mounting holes for attaching the base cap to a housing of the drive object;
a control part disposed on a side of the end cap opposite to the motor case and configured to control a power supply;
a signal connector extending from the control part in a radially-outward direction relative to the motor case and configured to receive control signals for input into the control part; and
a power supply connector extending from the control part in a radially-outward direction relative to the motor case and configured to receive an electric current, wherein
the mounting holes are formed at equiangular intervals around the base cap,
the mounting holes are positioned on the base cap flanges and include a first mounting hole and a second mounting hole, the base cap holes include a first base cap hole, a second base cap hole, and a third base cap hole, the first base cap hole is positioned on a first side of a virtual plane defined by the first mounting hole, the second mounting hole, and the center axis of the motor case, the second base cap hole and the third base cap hole are positioned on a side opposite the first side of the virtual plane such that the second base cap hole is positioned adjacent to the first mounting hole and the third base cap hole is positioned adjacent to the second mounting part, a first end cap hole from the three end cap holes is positioned in axial alignment with the first base cap hole and is positioned adjacent to a side of at least one of the signal connector or the power supply connector such that the first end cap hole is obstructed from view by the at least one of the signal connector or the power supply connector when viewing the motor case along the center axis of the motor case from the second motor end to the first motor end, and an angle between the second base cap hole and one of the mounting holes is the same as an angle between the third base cap hole and another one of the mounting holes, with reference to the virtual plane.

7. The electric power steering device in claim 6, wherein the at least two mounting holes are arranged at different angular intervals around the base cap.

8. A rotating electric machine comprising:

a motor case having a center axis and a cylinder shape with a first motor end and a second motor end, wherein the second motor end is opposite to the first motor end;

a stator housed in the motor case;

a winding wound on the stator;

a rotor rotatably disposed inside of the stator;

a shaft disposed at a rotation center of the rotor;

a base cap covering the first motor end of the motor case, having a first shaft hole at an axial center of the base cap for receiving the shaft, and base cap flanges formed on a circumferential edge of the base cap and extending radially-outward beyond an outer wall of the motor case;

an end cap covering the second motor end of the motor case, having a second shaft hole at an axial center of the end cap for receiving the shaft, and end cap flanges formed on a circumferential edge of the end cap and extending radially-outward beyond the outer wall of the motor case;

an output rod disposed on the shaft and connected to a drive object for outputting a rotation to the drive object;

three base cap holes formed on the base cap and positioned on the base cap flanges;

three end cap holes formed on the end cap, positioned on the end cap flanges, and in axial alignment with the base cap holes;

three through bolts inserted into the base cap holes and the end cap holes for fastening the base cap flanges to the end cap flanges;

at least two mounting holes formed on the base cap flanges;

at least two mounting bolts inserted into the mounting holes for attaching the base cap to a housing of the drive object;

a control part disposed on a side of the end cap opposite to the motor case and configured to control a power supply;

a signal connector extending from the control part in a radially-outward direction relative to the motor case and configured to receive control signals for input into the control part; and a power supply connector extending from the control part in a radially-outward direction relative to the motor case and configured to receive an electric current, wherein the mounting holes are formed at equiangular intervals around the base cap, the mounting holes are positioned on the base cap flanges and include a first mounting hole and a second mounting hole, the base cap holes include a first base cap hole, a second base cap hole, and a third base cap hole, the first base cap hole is positioned on a first side of a virtual plane defined by the first mounting hole, the second mounting hole, and the center axis of the motor case, the second base cap hole and the third base cap hole are positioned on a side opposite the first side of the virtual plane such that the second base cap hole is positioned adjacent to the first mounting hole and the third base cap hole is positioned adjacent to the second mounting part, and one of the three end cap holes is positioned in axial alignment with the first base cap hole and is positioned adjacent to a side of at least one of the signal connector or the power supply connector such that the one of the three end cap holes is obstructed from view by the at least one of the signal connector or the power supply connector when viewing the motor case along the center axis of the motor case from the second motor end to the first motor end, the signal connector and the power supply connector are formed having a single body, and the one of the three end cap holes corresponding to the first based cap hole that is positioned on the first side of the virtual plane is positioned between the signal connector and the power supply connector.

* * * * *